US010471892B2

(12) United States Patent
Kang et al.

(10) Patent No.: US 10,471,892 B2
(45) Date of Patent: Nov. 12, 2019

(54) APPARATUS FOR GENERATING SOUND BY USING CAR BODY

(71) Applicant: Yeil Electronics Co., Ltd., Incheon (KR)

(72) Inventors: Yoon Kyu Kang, Gyeonggi-do (KR); Jae Yong Kim, Busan (KR)

(73) Assignee: Yeil Electronics Co., Ltd, Incheon (KR)

( * ) Notice: Subject to any disclaimer, the term of this patent is extended or adjusted under 35 U.S.C. 154(b) by 0 days.

(21) Appl. No.: 15/764,034

(22) PCT Filed: Apr. 18, 2017

(86) PCT No.: PCT/KR2017/004140
§ 371 (c)(1),
(2) Date: Mar. 28, 2018

(87) PCT Pub. No.: WO2018/004119
PCT Pub. Date: Jan. 4, 2018

(65) Prior Publication Data
US 2019/0111840 A1    Apr. 18, 2019

(30) Foreign Application Priority Data

Jul. 1, 2016    (KR) .................. 10-2016-0083595

(51) Int. Cl.
H04R 9/02    (2006.01)
G10K 9/00   (2006.01)
(Continued)

(52) U.S. Cl.
CPC .............. B60Q 5/008 (2013.01); G10K 9/13 (2013.01); G10K 9/20 (2013.01); G10K 9/22 (2013.01);
(Continued)

(58) Field of Classification Search
CPC ... H04R 9/00; H04R 9/02; H04R 9/06; H04R 9/025; H04R 9/043; H04R 9/046;
(Continued)

(56) References Cited

U.S. PATENT DOCUMENTS 9,313,579 B2    4/2016  Lee et al.
2011/0129112 A1*  6/2011  Satoh ................. H04R 9/06
                                                381/413
(Continued)

FOREIGN PATENT DOCUMENTS

| JP | 3491541 B2 | 11/2013 |
| KR | 1020100101358 A | 4/2011 |
| KR | 1020140110126 A | 9/2014 |
| KR | 101519265 B1 | 5/2015 |
| KR | 1020150105788 A | 9/2015 |

Primary Examiner — Thang V Tran
(74) Attorney, Agent, or Firm — Umberg Zipser LLP

(57) ABSTRACT

An exemplary embodiment of the present disclosure may provide a sound generator which is connected to a vehicle body and generates sound, the sound generator including: a magnetic circuit generating vibration; a yoke contacting an upper surface of the magnetic circuit; an elastic member contacting at least a part of an upper surface of the yoke and performing vibration motion; a housing including an internal space formed as upper and lower sides of the housing are opened and lateral sides of the housing are closed; and a coil receiving an alternating current signal provided from the outside, wherein the coil is positioned in the internal space of the housing, wherein the sound generator transmits the vibration generated by the magnetic circuit to the vehicle body and vibrate at least a part of the vehicle body such that sound is generated from the vehicle body.

10 Claims, 11 Drawing Sheets

(51) Int. Cl.
   *B60Q 5/00*    (2006.01)
   *H04R 1/00*    (2006.01)
   *G10K 9/13*    (2006.01)
   *G10K 9/20*    (2006.01)
   *G10K 9/22*    (2006.01)
   *H04R 9/06*    (2006.01)
   *H04R 9/04*    (2006.01)

(52) U.S. Cl.
   CPC ............... *H04R 9/06* (2013.01); *H04R 9/025* (2013.01); *H04R 9/046* (2013.01); *H04R 2499/13* (2013.01)

(58) Field of Classification Search
   CPC ...... H04R 9/066; H04R 1/00; H04R 2499/13; G10K 9/00; G10K 9/13; G10K 9/20; G10K 9/22; B60Q 5/00; B60Q 5/008
   See application file for complete search history.

(56) References Cited

U.S. PATENT DOCUMENTS

| | | | |
|---|---|---|---|
| 2011/0193426 A1* | 8/2011 | Chung | B06B 1/045 310/25 |
| 2011/0309691 A1* | 12/2011 | Park | H02K 33/16 310/25 |
| 2012/0169146 A1* | 7/2012 | Choi | H02K 33/16 310/15 |
| 2013/0033128 A1* | 2/2013 | Yoon | H02K 33/16 310/25 |
| 2014/0121864 A1* | 5/2014 | Nakatani | B60Q 5/008 701/22 |
| 2014/0252890 A1* | 9/2014 | Lee | H02K 33/16 310/25 |
| 2014/0363019 A1 | 12/2014 | Funahashi | |
| 2018/0048962 A1* | 2/2018 | Kang | G02B 27/017 |

* cited by examiner (a)

(b)

ved at home and abroad. Therefore, a vehicle, which is not really

APPARATUS FOR GENERATING SOUND BY USING CAR BODY

TECHNICAL FIELD

The present disclosure relates to an apparatus for outputting vibration, and more particularly, to an apparatus for generating sound by generating vibration and transmitting the generated vibration to a vehicle body.

BACKGROUND ART

Recently, new technologies related to vehicles, electric vehicles, and hybrid vehicles have been consistently developed at home and abroad. Therefore, a vehicle, which generates noise that cannot be recognized by humans when the vehicle travels at a low speed, has been developed.

When the vehicle travels while generating noise that cannot be recognized by humans, a pedestrian is likely to have an accident because the pedestrian cannot recognize the vehicle.

Therefore, in the U.S., regulations related to improving pedestrian safety have been made to provide a minimum criterion for generating noise when electric and hybrid vehicles travel at a low speed of 30 km or lower.

Therefore, there is a need for researches on an apparatus for generating virtual engine sound when the electric and hybrid vehicles travel at a low speed.

In addition, there is a need for researches on an apparatus for generating sound of various vehicles in accordance with various preferences of consumers in respect to vehicle sound.

DISCLOSURE

Technical Problem

An object of an exemplary embodiment of the present disclosure is to provide an apparatus for generating sound by generating vibration and transmitting the generated vibration to a vehicle body.

Another object of the exemplary embodiment of the present disclosure is to provide an apparatus for generating omnidirectional sound by using a vehicle body.

Technical Solution

An exemplary embodiment of the present disclosure may provide a sound generator which is connected to a vehicle body and generates sound, the sound generator including: a magnetic circuit generating vibration; a yoke contacting an upper surface of the magnetic circuit; an elastic member contacting at least a part of an upper surface of the yoke and performing vibration motion; a housing including an internal space formed as upper and lower sides of the housing are opened and lateral sides of the housing are closed; and a coil receiving an alternating current signal provided from the outside, wherein the coil is positioned in the internal space of the housing, wherein the sound generator transmits the vibration generated by the magnetic circuit to the vehicle body and vibrate at least a part of the vehicle body such that sound is generated from the vehicle body.

Advantageous Effects

According to the exemplary embodiment of the present disclosure, it is possible to provide the apparatus for generating sound by generating vibration and transmitting the generated vibration to the vehicle body.

According to the exemplary embodiment of the present disclosure, it is possible to provide the apparatus for generating omnidirectional sound by using the vehicle body.

DESCRIPTION OF DRAWINGS

Various aspects will now be described with reference to the drawings, and similar reference numerals are used to generally denote similar constituent elements. In the following exemplary embodiments, for the purpose of description, multiple particular details are presented to provide overall understanding of one or more aspects. However, it is apparent that the aspect(s) may be carried out without the particular details. In other exemplary embodiments, publicly known structures and apparatuses are illustrated in the form of a block diagram in order to easily describe one or more aspects.

BEST MODE

Figure 1:
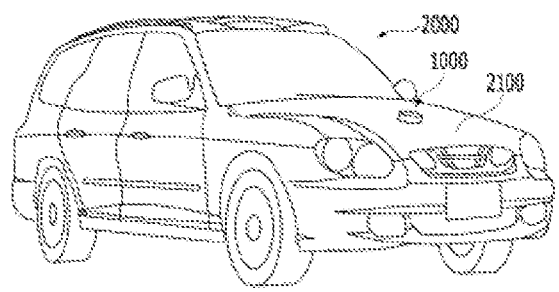
FIG. 1 is a view illustrating a sound generator according to an exemplary embodiment of the present disclosure.

The aforementioned objects, features, and advantages of the present disclosure will become more apparent from the following exemplary embodiments related to the accompanying drawings. The following descriptions of specific structures and functions are exemplified only for explaining the exemplary embodiments according to the concept of the present disclosure, and the exemplary embodiments according to the concept of the present disclosure may be embodied in various forms and should not be construed as being limited to the exemplary embodiments described in the present specification or application.

The exemplary embodiments according to the concept of the present disclosure may be changed in various forms and may include various forms, such that specific exemplary embodiments will be illustrated in the drawings and described in detail in the present specification or application. However, the description is not intended to limit the exemplary embodiments according to the concept of the present disclosure to the specific disclosed forms, and it is to be understood that all the changes, equivalents, and substitutions belonging to the spirit and technical scope of the present disclosure are included in the present disclosure.

The terms such as "first" and/or "second" may be used to describe various constituent elements, but the constituent elements are not limited to the terms. The terms are used only for the purpose of differentiating one constituent element from the other constituent elements, and for example, a first constituent element may be named a second constituent element, and similarly, the second constituent element may also be named the first constituent element, without departing from the scope according to the concept of the present disclosure.

When one constituent element is described as being "connected" or "coupled" to another constituent element, it should be understood that one constituent element can be connected or coupled directly to another constituent element, and an intervening constituent element can also be present between the constituent elements. When one constituent element is described as being "connected directly to", "coupled directly to", or "in contact with" another constituent element, it should be understood that no intervening constituent element is present between the constituent elements. Other expressions for explaining relationships between constituent elements, that is, the expressions such as "between" and "right between", or "adjacent to" and "adjacent directly to" should be construed similarly.

Terms used in the present specification are used only to describe specific exemplary embodiments, and are not intended to limit the present disclosure. Singular expressions used herein include plurals expressions unless they have definitely opposite meanings in the context. In the present application, it will be appreciated that terms "including" and "having" are intended to designate the existence of characteristics, numbers, steps, operations, constituent elements, and components described in the specification or a combination thereof, and do not exclude a possibility of the existence or addition of one or more other characteristics, numbers, steps, operations, constituent elements, and components, or a combination thereof in advance.

All terms used herein including technical or scientific terms have the same meanings as meanings which are generally understood by those with ordinary skill in the technical field to which the present disclosure pertains unless otherwise defined. Terms defined in a generally used dictionary shall be construed as meanings matching those in the context of a related art, and shall not be construed as ideal or excessively formal meanings unless clearly defined in the present specification.

Hereinafter, the exemplary embodiments of the present disclosure will be described in more detail with reference to the accompanying drawings.

FIG. 1 is a view illustrating a sound generator according to an exemplary embodiment of the present disclosure.

A sound generator 1000 according to the exemplary embodiment of the present disclosure may be connected to a vehicle body 2000. For example, the sound generator 1000 may be included in the vehicle body.

The sound generator 1000 may generate vibration and may transmit the generated vibration to the vehicle body. The transmitted vibration may vibrate at least a part of the vehicle body, thereby generating sound. For example, the sound generator 1000 may generate sound by vibrating a bonnet 2100 of the vehicle body 2000.

The sound generator 1000 may generate various types of sound. For example, the sound generator may generate, but not limited to, virtual engine sound, music, and vehicle operation sound.

In this case, the sound generator 1000 generates omnidirectional sound. For example, the omnidirectional sound may be generated as the vibration generated by the sound generator 1000 vibrates at least a part of the vehicle body.

Since the omnidirectional sound is generated, a pedestrian may recognize an approaching vehicle, such that a risk of a pedestrian accident may be reduced.

Figure 2:
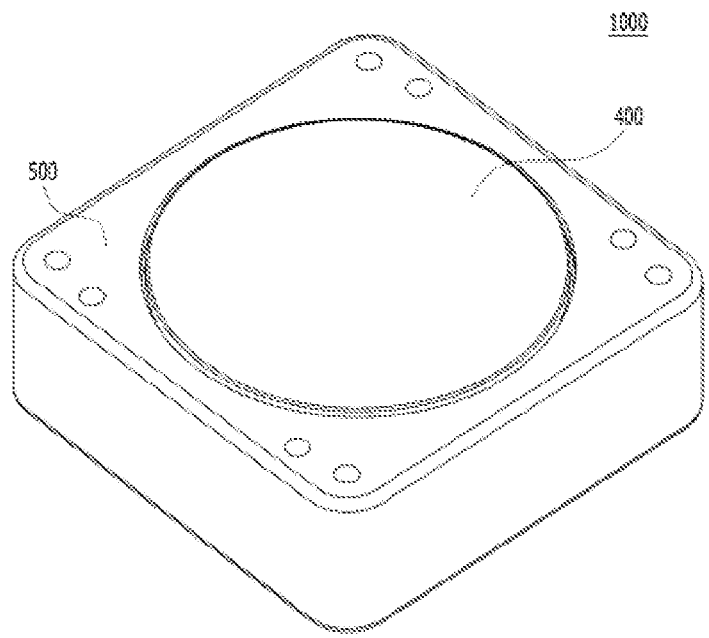
FIG. 2 is a view illustrating an external shape of the sound generator according to the exemplary embodiment of the present disclosure.
Figure 3:
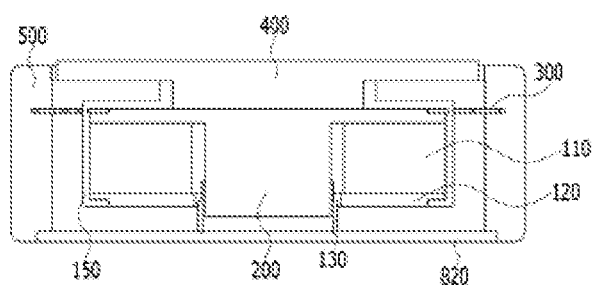
FIG. 3 is a view illustrating a structure of the sound generator according to the exemplary embodiment of the present disclosure.

FIG. 2 is a view illustrating an external shape of the sound generator according to the exemplary embodiment of the present disclosure, and FIG. 3 is a view illustrating a structure of the sound generator according to the exemplary embodiment of the present disclosure.

Referring to FIG. 2, a vibration plate 400 may be exposed to the outside from the sound generator 1000. The sound generator 1000 may transmit vibration to the vehicle body 2000 through the vibration plate 400.

Referring to FIG. 3, the sound generator 1000 according to the exemplary embodiment of the present disclosure may include a magnetic circuit 100, a yoke 200, an elastic member 300, and a housing 500.

The magnetic circuit 100 may generate vibration. The magnetic circuit 100 may include a magnet 110 and a top plate 120. Here, the magnet 110 may be made of a material having magnetic force and may vibrate in accordance with a change in peripheral magnetic field. In addition, the top plate 120 may concentrate the magnetic force of the magnet 110.

The magnetic circuit 100 may be provided to be spaced apart from a coil 130 at a predetermined interval. When the alternating current signal is applied to the coil 130, the magnet 110 may vibrate in accordance with a direction and intensity of the alternating current signal applied to the coil 130 and a magnitude of a frequency of the alternating current signal. In other words, the magnet 110 may function as a vibrator which vibrates in accordance with the alternating current signal applied to the coil 130.

This situation is caused by Fleming's left-hand rule defining that a conductor placed in a magnetic field receives force in a predetermined direction, and because the theory related to the principle is a publicly known technology, a detailed description thereof will be omitted.

In the related art, a vibration motor using a brush and a commutator is often used, but the vibration motor has a problem with excessive noise and miniaturization. The sound generator 1000 according to the present disclosure includes the coil 130 and the magnetic circuit 100 in order to generate vibration, and the vibration generated by the magnetic circuit 100 may be transmitted to the yoke 200 which is in contact with an upper surface of the magnetic circuit 100.

The yoke 200 may be provided to be in contact with the upper surface of the magnetic circuit 100. Here, the contact between the yoke 200 and the magnetic circuit 100 means that a separate vibration transmitting body is not provided between the yoke 200 and the magnetic circuit 100, and the vibration generated by the magnetic circuit 100 is transmitted directly to the yoke 200. In other words, the yoke 200 is sequentially stacked on the upper surface of the magnetic circuit 100 or the magnetic circuit 100 and the yoke 200 are integrally manufactured at the time of manufacturing the magnetic circuit 100 and the yoke 200, such that the vibration generated by the magnetic circuit 100 may be transmitted directly to the yoke 200.

The yoke 200 may have various shapes. For example, the yoke 200 may include an upper surface in the form of a circular plate. In addition, the yoke 200 may include the upper surface which is surrounded by four edges of which the intersection points are curved, but the yoke 200 is not limited thereto.

In addition, the yoke 200 may include a protruding portion formed on a bottom surface of the yoke 200. The protruding portion may have various shapes. For example, the protruding portion may have, but not limited to, a cylindrical shape or a quadrangular column shape.

In addition, the yoke 200 may include a stepped portion formed on the upper surface of the yoke 200. For example, a groove may be formed by the stepped portion at the edge of the upper surface of the yoke 200.

At least a part of the elastic member 300 may be in contact with the upper surface of the yoke 200. For example, a vibration portion 312 of the elastic member 300 may be in contact with the upper surface of the yoke 200. For example, in detail, the vibration portion 312 of the elastic member 300 may be seated in the groove formed at the edge of the upper surface of the yoke 200.

In this case, a separate vibration transmitting body is not provided between the yoke 200 and the elastic member 300, and the vibration generated by the magnetic circuit 100 may be transmitted directly to the elastic member 300 through the yoke 200.

The elastic member 300 is sequentially stacked on the upper surface of the yoke 200 or the elastic member 300 and the yoke 200 are integrally manufactured at the time of manufacturing the elastic member 300 and the yoke 200, such that the vibration generated by the magnetic circuit 100 may be transmitted to the elastic member 300 through the yoke 200.

The elastic member 300 may include multiple constituent elements. For example, the elastic member 300 may include, but not limited to, a fixing portion 314, a connecting portion 316, and the vibration portion 312.

The vibration portion 312 of the elastic member 300 is in contact with at least a part of the upper surface of the yoke 200, such that the vibration portion 312 may vibrate in accordance with the vibration of the magnetic circuit 100. A lower surface of the vibration portion 312 of the elastic member 300 is in contact with the upper surface of the yoke 200, and a lower surface of the yoke 200 is in contact with the upper surface of the magnetic circuit 100, such that the vibration generated by the magnetic circuit 100 may be transmitted directly to the elastic member 300 through the yoke 200.

For example, when the magnetic circuit 100 moves upward, the yoke 200, which is in contact with the upper surface of the magnetic circuit 100, and the vibration portion 312 of the elastic member 300, which is in contact with the upper surface of the yoke 200, are also moved upward. In this case, the fixing portion 314 of the elastic member 300 is fixed to the housing 500, such that the fixing portion 314 may not be moved.

The vibration portion 312 of the elastic member 300, which moves upward, may receive downward force by elasticity of the elastic member 300, and the vibration portion 312 of the elastic member 300 may move downward. The aforementioned processes are repeated, such that the magnetic circuit 100 and the yoke 200 may perform vibration motion while moving upward and downward.

As another example, when the magnetic circuit 100 moves downward, the yoke 200, which is coupled to the upper surface of the magnetic circuit 100, and the vibration portion 312 of the elastic member 300, which is coupled to the upper surface of the yoke 200, are also moved downward. In this case, the fixing portion 314 of the elastic member 300 is fixed to the housing 500, such that the fixing portion 314 may not be moved.

The elastic member 300 may be formed by various methods. For example, the fixing portion 314, the connecting portion 316, and the vibration portion 312 of the elastic member 300 may be separately formed and then coupled. In addition, the fixing portion 314, the connecting portion 316, and the vibration portion 312 may be integrally formed by, but not limited to, a casting process using a metal member.

The housing 500 includes openings formed in the upper and lower surfaces thereof, and lateral sides thereof are closed, such that the housing 500 may have an internal space. For example, the housing 500 may have a cylindrical shape opened at upper and lower sides thereof. In addition, the housing 500 may have, but not limited to, a quadrangular column shape opened at upper and lower sides thereof.

At least one constituent element of the sound generator may be included in the internal space in the housing 500. For example, the coil 130, the magnetic circuit 100, the yoke 200, the elastic member 300, or a combination thereof may be included in the internal space of the housing 500, the at least one constituent element is not limited thereto.

The housing 500 may be formed by various members. The housing 500 may be formed by, but not limited to, a metal member (e.g., iron, nickel, copper, etc.) or reinforced plastic.

The magnetic circuit guide 150 includes openings formed in the upper and lower surfaces thereof, and lateral sides thereof are closed, such that the magnetic circuit guide 150 may have an internal space. For example, the magnetic circuit guide 150 may have a cylindrical shape opened at upper and lower sides thereof. In addition, the magnetic circuit guide 150 may have, but not limited to, a quadrangular column shape opened at upper and lower sides thereof.

The magnetic circuit guide 150 may be positioned in the housing 500. At least one of the yoke 200, the elastic member 300, the magnetic circuit 100, and the vibration plate 400 may be positioned in the magnetic circuit guide 150. For example, an inner surface of the magnetic circuit guide 150 may be in contact with at least one of the yoke 200, the elastic member 300, the magnetic circuit 100, and the vibration plate 400. In addition, the magnetic circuit guide 150 may fix at least one of the yoke 200, the elastic member 300, the magnetic circuit 100, and the vibration plate 400.

An upper surface of the magnetic circuit guide 150 may be in contact with at least a part of the upper surface of the yoke 200. For example, in a case in which the stepped portion is formed on the upper surface of the yoke 200, the magnetic circuit guide 150 may be in contact with an upper end of the stepped portion of the yoke.

In addition, an opening may be formed in the upper surface of the magnetic circuit guide 150. The vibration plate 400 may be exposed to the outside from the sound generator 1000 through the opening formed in the upper surface of the magnetic circuit guide 150.

In addition, at least a part of the upper surface of the magnetic circuit guide 150 may be bent outward from the sound generator 1000. For example, a part of the upper surface of the magnetic circuit guide 150 may be bent outward from the sound generator 1000 along the vibration plate 400. In this case, the bent portion of the magnetic circuit guide 150 may be in contact with the vibration plate 400.

A part of the upper surface of the magnetic circuit guide 150, which is in contact with the vibration plate 400, may fix the vibration plate to the yoke, but the present disclosure is not limited thereto.

An inner surface of the magnetic circuit guide 150 may be in contact with the magnetic circuit 100. In addition, the inner surface of the magnetic circuit guide 150 may be in contact with a lateral surface of the yoke 200.

In addition, a lateral surface of the magnetic circuit guide 150 may include at least one hole. For example, at least one hole may be present in an upper portion of the lateral surface of the magnetic circuit guide 150. The connecting portion 316 of the elastic member 300 may connect the fixing portion 314 of the elastic member 300 and the vibration portion 312 of the elastic member 300 through at least one hole included in the magnetic circuit guide 150.

A lower surface of the magnetic circuit guide 150 may include an opening. A part of the yoke 200 may be exposed through the opening in the lower surface of the magnetic circuit guide 150. For example, the protruding portion formed on the bottom surface of the yoke 200 may be exposed through the opening in the lower surface of the magnetic circuit guide 150.

In addition, the magnetic circuit 100 may be seated on the lower surface of the magnetic circuit guide 150. For example, the top plate 120 of the magnetic circuit 100 may be seated on the lower surface of the magnetic circuit guide 150. A lower surface of the top plate 120 may include a stepped portion, and the top plate 120 may be seated on the lower surface of the magnetic circuit guide 150 by the stepped portion of the top plate 120.

According to another exemplary embodiment of the present disclosure, the top plate 120 may be attached to the lower surface of the magnetic circuit guide 150. The top plate 120 may be fixed by being attached to the lower surface of the magnetic circuit guide 150.

Figure 4:
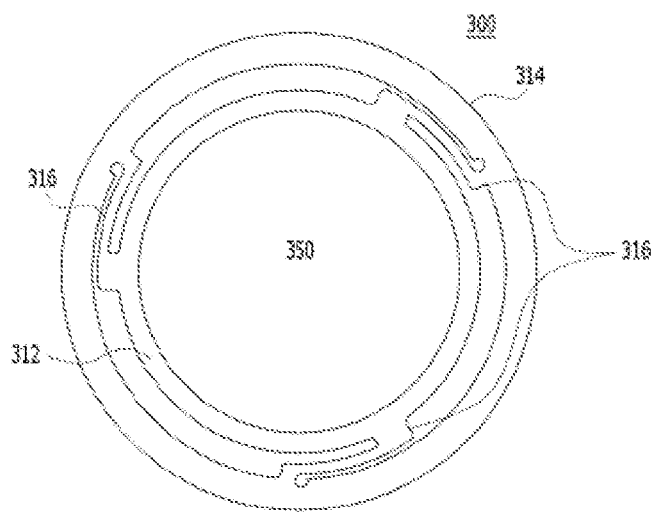
FIG. 4 is a view illustrating an elastic member according to the exemplary embodiment of the present disclosure.

FIG. 4 is a view illustrating the elastic member according to the exemplary embodiment of the present disclosure.

The elastic member according to the present disclosure may include the vibration portion 312, the fixing portion 314, and the connecting portion 316.

According to the exemplary embodiment of the present disclosure, the fixing portion 314 may have various shapes. For example, the fixing portion 314 may have, but not limited to, an annular plate shape opened at a central portion thereof or a quadrangular plate shape opened at a central portion thereof.

According to the exemplary embodiment of the present disclosure, the vibration portion 312 may have various shapes. For example, the vibration portion 312 may have, but not limited to, an annular plate shape opened at a central portion thereof or a quadrangular plate shape opened at a central portion thereof.

In this case, a size of the vibration portion 312 may be smaller than a size of the fixing portion 314. In addition, the vibration portion 312 may be positioned in the opening formed in the central portion of the fixing portion 314.

According to the exemplary embodiment of the present disclosure, the elastic member 300 may include the at least one connecting portion 316.

The connecting portion 316 may connect the fixing portion 314 and the vibration portion 312. For example, the connecting portion 316 may connect the fixing portion 314 and the vibration portion 312 positioned in the opening formed in the central portion of the fixing portion 314. In addition, the connecting portion 316 may provide elasticity so that the vibration portion 312 may vibrate.

According to the exemplary embodiment of the present disclosure, when the magnetic circuit 100 moves upward, the yoke 200, which is in contact with the upper surface of the magnetic circuit 100, also moves upward, and the vibration portion 312 of the elastic member 300 also moves in the same direction. In this case, the fixing portion 314 of the elastic member 300 is not moved, such that the elastic member 300 may be bent by elasticity. A space 212, which allows the elastic member 300 to be bent, needs to be provided so that the elastic member 300 may be bent, and as a result, a space in which the elastic member 300 may perform the vibration motion may be provided between the yoke 200 and the housing 500 according to the exemplary embodiment of the present disclosure.

When the magnetic circuit 100 moves downward, the yoke 200, which is in contact with the upper surface of the magnetic circuit 100, also moves downward, and the vibration portion 312 of the elastic member 300 also moves in the same direction. In this case, the fixing portion 314 of the elastic member 300 is not moved, such that the elastic member 300 may be bent by elasticity.

Figure 5:
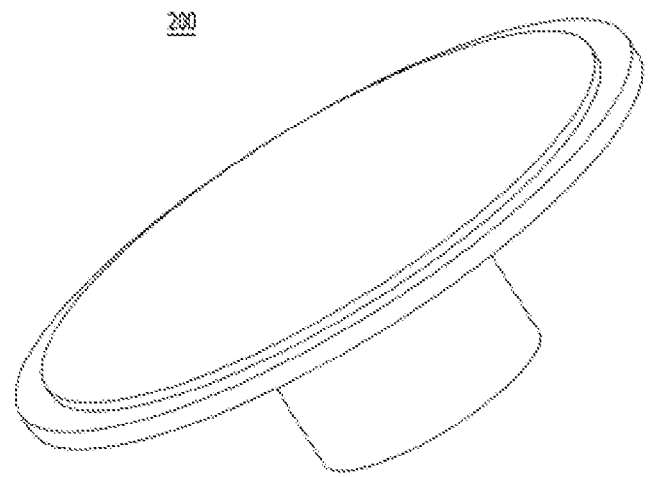
FIG. 5 is a view illustrating a yoke according to the exemplary embodiment of the present disclosure.
Figure 6:
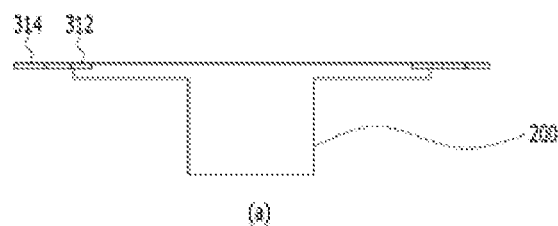
FIG. 6 is a view illustrating a method of coupling the yoke and the elastic member according to the exemplary embodiment of the present disclosure.
Figure 6:
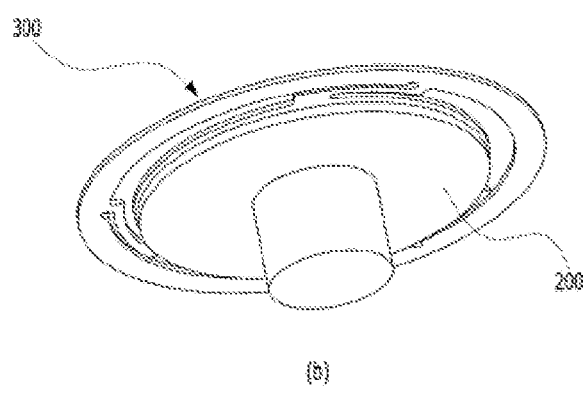

FIG. 5 is a view illustrating the yoke according to the exemplary embodiment of the present disclosure, and FIG. 6 is a view illustrating a method of coupling the yoke and the elastic member according to the exemplary embodiment of the present disclosure.

According to the exemplary embodiment of the present disclosure, the yoke 200 may transmit the vibration generated by the magnetic circuit 100 to the elastic member 300. For example, when the magnetic circuit 100 vibrates in accordance with an alternating current signal applied to the coil 130, the vibration is transmitted directly to the yoke 200 which is in contact with the magnetic circuit 100, and the vibration transmitted to the yoke 200 may be transmitted to the elastic member 300 which is in contact with the upper surface of the yoke 200.

The yoke 200 may have various shapes. For example, the yoke 200 may include the upper surface in the form of a circular plate. At least a part of the upper surface of the yoke 200 is in contact with at least a part of the bottom surface of the elastic member 300, such that the yoke 200 may transmit the vibration, which is transmitted from the magnetic circuit 100, to the elastic member 300.

The yoke 200 may include a bottom surface in the form of a circular plate. In addition, the yoke 200 may include the protruding portion formed at a central portion of the bottom surface of the yoke 200. For example, the yoke 200 may include a cylindrical protruding portion formed at the central portion of the bottom surface of the yoke 200.

The aforementioned shapes of the yoke 200 are just an exemplary embodiment, and the yoke 200 may have various shapes.

The yoke 200 may include the stepped portion formed on the upper surface of the yoke 200. For example, the yoke 200 may include the stepped portion formed between the central portion and the edge of the upper surface thereof. The central portion of the upper surface of the yoke 200 may protrude, and a groove may be formed at the edge of the upper surface of the yoke 200.

Referring to FIG. 6, the vibration portion 312 of the elastic member 300 may be seated in the groove formed at the edge of the upper surface of the yoke 200. The elastic member 300 and the yoke 200 may be coupled to each other as the vibration portion 312 of the elastic member 300 is seated in the groove formed at the edge of the upper surface of the yoke 200.

In this case, the vibration portion 312 of the elastic member 300 may be attached into the groove formed at the edge of the yoke 200, or the elastic member 300 and the yoke 200 may be integrally formed, but the present disclosure is not limited thereto.

Figure 7:
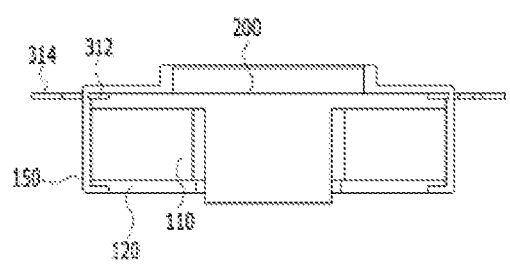
FIG. 7 is a view for explaining a method of coupling a magnetic circuit, the yoke, a magnetic circuit guide, and a vibration plate according to the exemplary embodiment of the present disclosure.

FIG. 7 is a view for explaining a method of coupling the magnetic circuit, the yoke, the magnetic circuit guide, and the vibration plate according to the exemplary embodiment of the present disclosure.

According to the exemplary embodiment of the present disclosure, the magnetic circuit 100 may include the magnet 110 and the top plate 120. The magnet 110 may be positioned in the internal space formed in the housing 500. In addition, the magnet 110 may surround the portion protruding from the bottom surface of the yoke 200.

The top plate 120 may be positioned on the bottom surface of the magnet 110. For example, the top plate 120 may be attached to the bottom surface of the magnet 110, or the top plate 120 may be fixed to the bottom surface of the magnet 110 by the magnetic circuit guide 150, but the present disclosure is not limited thereto.

The top plate 120 has a stepped portion formed on a bottom surface thereof. For example, since the stepped portion is formed on the bottom surface of the top plate 120, the top plate 120 may include a groove formed at an edge thereof.

The magnetic circuit guide 150 may be positioned in the groove formed at the edge of the bottom surface of the top plate 120. For example, the top plate 120 may be coupled to the magnetic circuit guide 150 through the groove formed at the edge of the bottom surface of the top plate 120.

According to the exemplary embodiment of the present disclosure, the magnetic circuit guide 150 may fix at least one of the yoke, the elastic member, the magnetic circuit, and the vibration plate. For example, the top plate 120 is seated on the lower surface of the magnetic circuit guide 150, the coil 130 is seated on the upper surface of the top plate 120, the yoke 200 is in contact with the upper portion of the top plate 120, the vibration portion 312 of the elastic member 300 is seated on the upper surface of the yoke 200, and the magnetic circuit guide 150 is in contact with the upper surface of the vibration portion 312 of the elastic member, such that the magnetic circuit guide 150 may fix the yoke, the elastic member, the magnetic circuit, and the vibration plate.

The lateral surface of the magnetic circuit guide 150 may include at least one hole. The connecting portion 316 of the elastic member 300 may connect the fixing portion 314 of the elastic member 300 and the vibration portion 312 of the elastic member 300 through the hole included in the magnetic circuit guide 150.

At least a part of the inner surface of the magnetic circuit guide 150 may be in contact with the vibration plate 400. For example, at least a part of the inner surface of the magnetic circuit guide 150 is in contact with the vibration plate 400, thereby preventing the vibration plate from moving. In addition, the magnetic circuit guide 150 may assist in attaching the vibration plate 400 to the yoke 200, but the present disclosure is not limited thereto.

Figure 8:
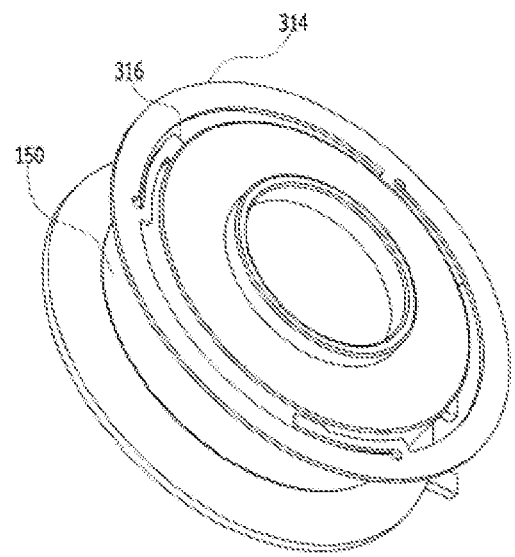
FIG. 8 is a view for explaining a positional relationship between the magnetic circuit guide and the elastic member according to the exemplary embodiment of the present disclosure.

FIG. 8 is a view for explaining a positional relationship between the magnetic circuit guide and the elastic member according to the exemplary embodiment of the present disclosure.

Referring to FIG. 8, the vibration portion 312 of the elastic member 300 may be positioned in the magnetic circuit guide 150.

The lateral surface of the magnetic circuit guide 150 may be provided with at least one hole. For example, three holes may be present in the lateral surface of the magnetic circuit guide 150.

Through the hole formed in the lateral surface of the magnetic circuit guide 150, the connecting portion of the elastic member 300 may connect the vibration portion 312 of the elastic member 300, which is positioned inside the magnetic circuit guide 150, with the fixing portion 314 of the elastic member 300 which is positioned outside the magnetic circuit guide 150.

The fixing portion 314 of the elastic member 300 may be positioned outside the magnetic circuit guide 150 and fixed to the inner surface of the housing 500.

Figure 9:
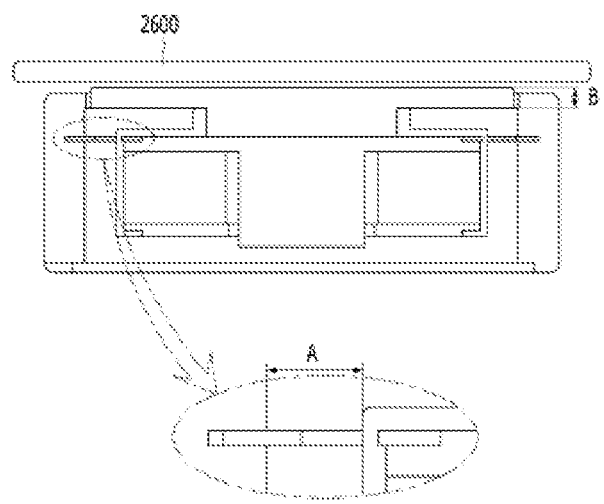
FIG. 9 is a view for explaining a method of changing a magnitude of vibration transmitted by the sound generator according to the exemplary embodiment of the present disclosure.

FIG. 9 is a view for explaining a method of changing a magnitude of vibration transmitted by the sound generator according to the exemplary embodiment of the present disclosure.

The intensity of the vibration transmitted to the vehicle body by the sound generator 1000 may be changed by various methods.

Referring to FIG. 9, the intensity of the vibration transmitted to the vehicle body by the sound generator 1000 may be changed in accordance with a length of an interval A formed between the magnetic circuit guide 150 and the housing 500.

For example, if the length of the interval A formed between the magnetic circuit guide 150 and the housing 500 is decreased, rigidity of the elastic member 300 may be increased. In addition, as the rigidity of the elastic member 300 is increased, a natural frequency may be decreased. As a result, the intensity of the vibration generated by the sound generator may be changed.

As another example, if the length of the interval A formed between the magnetic circuit guide 150 and the housing 500 is increased, rigidity of the elastic member 300 may be decreased. In addition, as the rigidity of the elastic member 300 is decreased, a natural frequency may be increased. As a result, the intensity of the vibration generated by the sound generator 1000 may be changed.

In addition, the intensity of the vibration transmitted to the vehicle body by the sound generator 1000 may be changed in accordance with a length of an interval between the vibration portion 312 of the elastic member 300 and the fixing portion 314 of the elastic member 300.

For example, if the length of the interval between the vibration portion 312 of the elastic member 300 and the fixing portion 314 of the elastic member 300 is changed, rigidity of the elastic member may be changed. In addition, a natural frequency of the elastic member 300 may be changed due to a change in rigidity of the elastic member. As a result, the intensity of the vibration transmitted to the vehicle body by the sound generator 1000 may be changed.

Referring to FIG. 9, the vibration plate 400 of the sound generator 1000 is in contact with a vehicle mounting device 2600, thereby transmitting vibration.

For example, if a thickness of an upper surface B of the vibration plate 400 has a value equal to or greater than a critical value, at least a part of the vibration plate 400 may protrude to the outside from the housing 500. Since the at least a part of the vibration plate 400 protrudes to the outside from the housing 500, the vibration plate 400 may be in contact with the vehicle mounting device 2600 in the case in which the sound generator 1000 is provided on the vehicle mounting device 2600, and an area in which the vibration plate 400 is in contact with the vehicle mounting device 2600 may be increased.

In this case, a space may be formed between the vehicle mounting device 2600 and the housing 500 of the sound generator 1000, and the sound generator 1000 may transmit vibration to the vehicle body through the vibration plate 400 without transmitting the vibration through the housing 500.

As a result, it is possible to increase an ability of the sound generator 1000 which transmits vibration with a low frequency. In addition, a frequency band for vibration transmission of the sound generator 1000 may remain flat.

According to another exemplary embodiment of the present disclosure, in the case in which the sound generator 1000 is provided on the vehicle mounting device 2600, the vibration plate 400 may not protrude to the outside from the housing 500 when the thickness of the upper surface B of the vibration plate 400 has a value smaller than the critical value. In addition, at least a part of the vibration plate 400 may not be in contact with the vehicle mounting device 2600.

Even though the vibration plate 400 is not in contact with the vehicle mounting device 2600, the vibration plate 400 may be in contact with the vehicle mounting device 2600 when the vibration plate 400 vibrates, and the vibration may be transmitted through the vibration plate 400.

According to the exemplary embodiment of the present disclosure, in the case in which the sound generator 1000 is provided on the vehicle mounting device 2600, a space may be provided between the housing 500 of the sound generator 1000 and the vehicle mounting device 2600. Since the space is provided between the housing 500 and the vehicle mounting device 2600, the housing 500 may not be in contact with the vehicle mounting device 2600, and the vibration generated by the sound generator 1000 may not be transmitted through the housing 500.

When the vibration is transmitted through the vibration plate 400 and the housing 500, vibratory force may be decreased due to an interference between the vibration transmitted through the vibration plate 400 and the vibration transmitted through the housing 500. According to the exemplary embodiment of the present disclosure, since the space is provided between the housing 500 and the vehicle mounting device 2600, the vibration generated by the sound generator 1000 may be transmitted to the vehicle body through the vibration plate 400 without being transmitted through the housing 500, and as a result, it is possible to prevent the vibratory force from being decreased.

Figure 10:
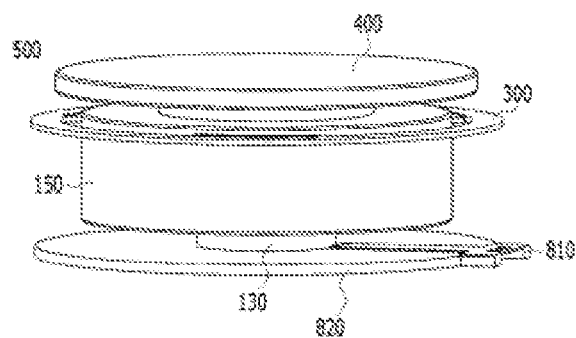
FIGS. 10 and 11 are views for explaining the structure of the sound generator according to the exemplary embodiment of the present disclosure.
Figure 11:
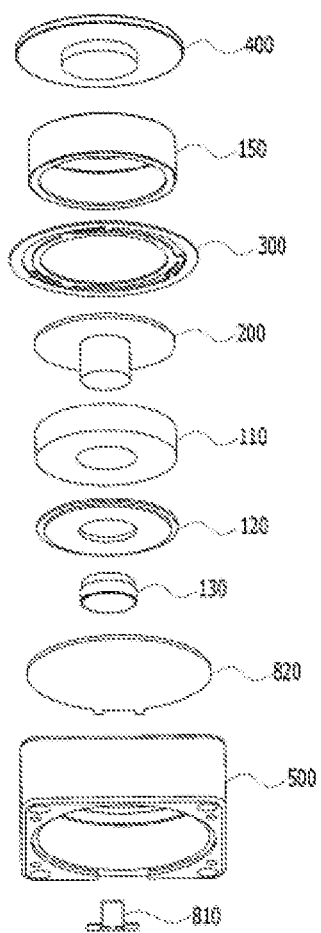

FIGS. 10 and 11 are views for explaining the structure of the sound generator according to the exemplary embodiment of the present disclosure.

Referring to FIG. 10, the sound generator 1000 according to the exemplary embodiment of the present disclosure may include a PCB 810. The PCB 810 may be provided on at least a part of an upper surface of a cap 820. The cap 820 may connect and fix the housing 500 and the PCB 810. As described above, the housing 500 is opened at the upper and lower sides thereof and has a cylindrical shape, such that the housing 500 may have the internal space. The coil 130 may be provided in the internal space in the housing 500. The coil 130 may change a magnetic field in accordance with the alternating current signal applied from the outside. The magnetic circuit 100 may be provided to be spaced apart from the coil 130 at a predetermined interval without being in contact with the coil 130. The magnetic circuit 100 may be provided with the top plate 120 and the magnet 110 which may concentrate magnetic force of the magnet 110.

The yoke 200 may be provided on the upper surface of the magnetic circuit 100, and the vibration of the magnetic circuit 100 may be transmitted to the yoke 200. In this case, the magnetic circuit 100 may be coupled to the yoke 200 by being attached directly to the yoke 200, or may be coupled to the yoke 200 by the magnetic circuit guide 150.

The upper surface of the yoke 200 may have various shapes. For example, the upper surface of the yoke 200 may have a flat circular plate shape having no stepped portion. In addition, since the upper surface of the yoke 200 includes the at least one stepped portion, it is possible to form the space in which the elastic member 300 may vibrate.

The vibration portion of the elastic member 300 may be in contact with a part of the upper surface of the yoke 200, and the fixing portion 314 of the elastic member 300 may be in contact with at least a part of the inner surface of the housing 500.

The vibration plate 400 is provided on the upper surface of the yoke 200, thereby transmitting the vibration of the magnetic circuit 100 to the vehicle body. The vibration transmitted to the vehicle body may vibrate a part of the vehicle body, thereby generating sound.

At least some of the aforementioned constituent elements may be coupled in other manners instead of riveting. For example, the elastic member 300 is attached directly to the yoke 200, and the vibration plate 400 is also attached directly to the yoke 200, such that the sound generator 1000 may have a structure from which the riveting is omitted.

Figure 12:
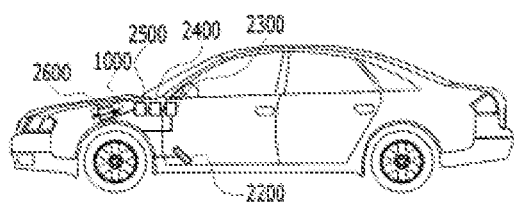
FIG. 12 is a view for explaining a vehicle according to the exemplary embodiment of the present disclosure.

FIG. 12 is a view for explaining a vehicle according to the exemplary embodiment of the present disclosure.

The vehicle according to the exemplary embodiment of the present disclosure may include a vehicle information collecting module 2300, a sound processing module 2400, an amplification module 2500, an acceleration input device 2200, the vehicle mounting device 2600, and the sound generator 1000.

The vehicle may receive a user's input through the acceleration input device 2200. The user may change a speed of the vehicle through the acceleration input device 2200.

The vehicle information collecting module 2300 may collect various types of information about the vehicle. For example, the vehicle information collecting module 2300 may collect information about the speed of the vehicle.

The sound processing module 2400 may generate a sound signal. In this case, the sound processing module 2400 may generate the sound signal by using vehicle information obtained by the vehicle information collecting module 2300. For example, the sound processing module 2400 may generate a virtual engine sound signal when the speed of the vehicle is low.

The amplification module 2500 may amplify the sound signal obtained from the sound processing module 2400. In addition, the amplification module 2500 may transmit the amplified sound signal to the sound generator 1000.

For example, the amplification module 2500 may amplify the virtual engine sound signal obtained from the sound processing module 2400, and may transmit the amplified virtual engine sound signal to the sound generator 1000.

The sound generator 1000 may convert the obtained signal into vibration. For example, the sound generator 1000 may convert the virtual engine sound signal into vibration. In this case, the sound generator 1000 may convert the virtual engine sound signal into vibration by changing electric current to be applied to the coil in accordance with the received virtual engine sound signal.

The vehicle mounting device 2600 may fix the sound generator 1000 to at least a part of the vehicle. For example, the vehicle mounting device 2600 may support the sound generator 1000 so that the sound generator 1000 may transmit vibration to the vehicle body.

At least a part of the vehicle body of the vehicle may generate sound. For example, the vehicle may generate sound while at least a part of the vehicle body is vibrated by the vibration transmitted by the sound generator 1000.

The sound generator 1000 transmits the generated vibration to the vehicle body, thereby generating omnidirectional sound. The sound generator 1000 transmits the vibration to the vehicle body, and the transmitted vibration vibrates at least a part of the vehicle body, such that omnidirectional sound may be generated from the at least a part of the vehicle body.

Since the omnidirectional sound is generated, a pedestrian may recognize an approaching vehicle, such that a risk of a pedestrian accident may be reduced.

Figure 13:
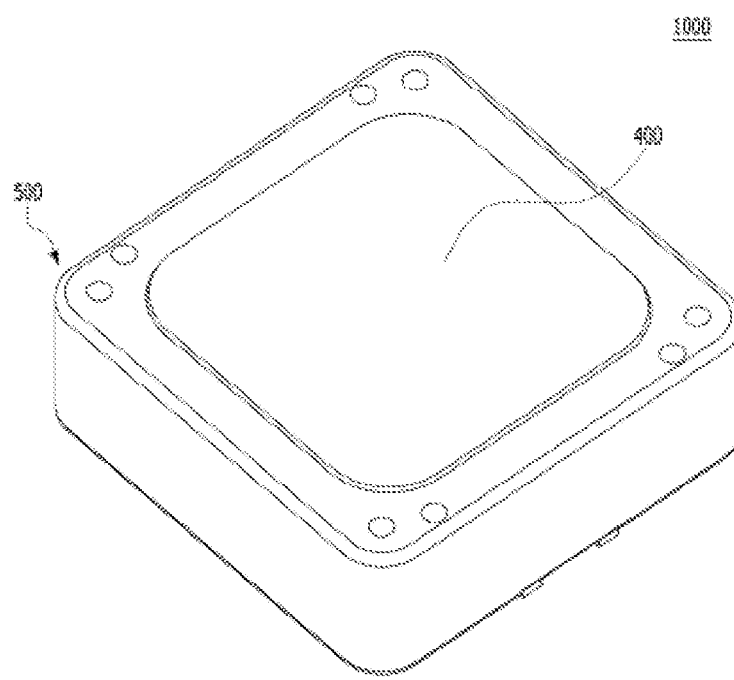
FIG. 13 is a view for explaining a sound generator 1000 according to another exemplary embodiment of the present disclosure.

FIG. 13 is a view for explaining the sound generator 1000 according to another exemplary embodiment of the present disclosure.

According to the exemplary embodiment of the present disclosure, the sound generator 1000 may include various shapes.

In addition, the sound generator 1000 may include the vibration plate 400 having various shapes.

For example, the vibration plate 400 may include, but not limited to, a circular upper surface, a quadrangular upper surface, or an upper surface which is surrounded by four edges of which the intersection points are curved.

Referring to FIG. 13, the vibration plate 400 may include the upper surface which is surrounded by the four edges of which the intersection points are curved.

Figure 14:
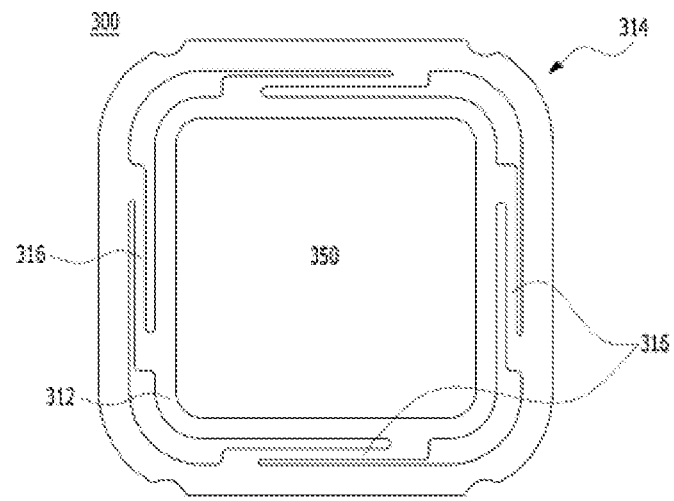
FIG. 14 is a view for explaining an elastic member according to another exemplary embodiment of the present disclosure.

FIG. 14 is a view for explaining an elastic member according to another exemplary embodiment of the present disclosure.

The elastic member 300 according to the present disclosure may have various shapes. For example, the vibration portion 312 of the elastic member 300 and the fixing portion 314 of the elastic member 300 may have various shapes.

Referring to FIG. 14, the vibration portion 312 of the elastic member 300 may be formed in a shape surrounded by four edges of which the intersection points are curved. In addition, the fixing portion 314 of the elastic member 300 may also be formed in a shape surrounded by four edges of which the intersection points are curved.

In this case, the vibration portion 312 of the elastic member 300 and the fixing portion 314 of the elastic member 300 may include therein openings. In addition, the opening included in the vibration portion 312 of the elastic member 300 may be smaller than the opening included in the fixing portion 314.

In addition, the vibration portion 312 of the elastic member 300 may be positioned in the opening included in the fixing portion 314 of the elastic member 300.

The vibration portion 312 of the elastic member 300 and the fixing portion 314 of the elastic member 300 may be connected to each other through the connecting portion 316. The connecting portion may have various shapes.

The fixing portion 314, the connecting portion 316, and the vibration portion 312 may be separately or integrally formed, but the present disclosure is not limited thereto.

Figure 15:
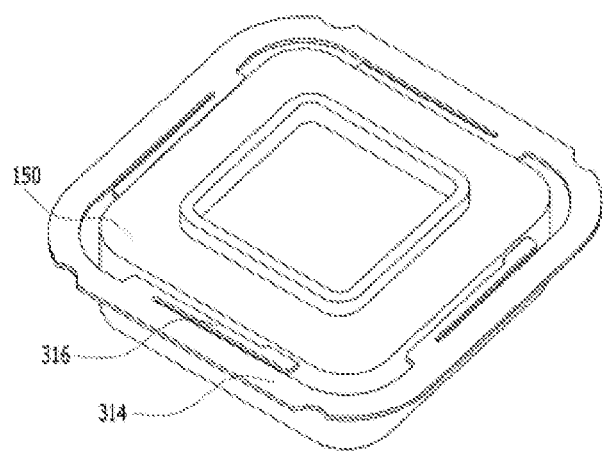
FIG. 15 is a view for explaining a method of coupling a magnetic circuit guide and the elastic member according to another exemplary embodiment of the present disclosure.

FIG. 15 is a view for explaining a method of coupling the magnetic circuit guide and the elastic member according to another exemplary embodiment of the present disclosure.

The magnetic circuit guide 150 may fix at least one of the yoke 200, the elastic member 300, the magnetic circuit 100, and the vibration plate 400. For example, the magnetic circuit guide 150 may be in contact with at least a part of each of the yoke, the elastic member 300, the magnetic circuit 100, and the vibration plate 400.

The upper surface of the magnetic circuit guide 150 may be in contact with at least a part of the upper surface of the yoke 200. In addition, an opening may be formed in the upper surface of the magnetic circuit guide 150. The vibration plate 400 may be exposed to the outside from the sound generator 1000 through the opening included in the upper surface of the magnetic circuit guide 150.

In addition, at least a part of the upper surface of the magnetic circuit guide 150 may be bent outward from the sound generator 1000. A part of the upper surface of the magnetic circuit guide 150 is bent along the vibration plate 400 and may be in contact with the vibration plate 400.

A part of the upper surface of the magnetic circuit guide 150, which is in contact with the vibration plate 400, may fix the vibration plate to the yoke, but the present disclosure is not limited thereto.

A lateral surface of the magnetic circuit guide 150 may be in contact with the magnetic circuit 100. In addition, the lateral surface of the magnetic circuit guide 150 may be in contact with a lateral surface of the yoke 200.

In addition, the lateral surface of the magnetic circuit guide 150 may include at least one hole. For example, at least one hole may be present in an upper portion of the lateral surface of the magnetic circuit guide 150. The connecting portion 316 of the elastic member 300 may connect the fixing portion 314 of the elastic member 300 and the vibration portion 312 of the elastic member 300 through the at least one hole included in the magnetic circuit guide 150.

Referring to FIG. 15, the magnetic circuit guide 150 includes openings formed in the upper and lower surfaces thereof, and a front side, a rear side, a left side, and a right side of the magnetic circuit guide 150 are closed, such that the magnetic circuit guide 150 may be formed to have an internal space. In addition, at least one of the front surface, the rear surface, the left surface, and the right surface of the magnetic circuit guide 150 may include a hole.

The connecting portion 316 of the elastic member 300 may connect the fixing portion 314 of the elastic member 300 and the vibration portion 312 of the elastic member 300 through the at least one hole included in the magnetic circuit guide 150.

In this case, the vibration portion 312 of the elastic member 300 may be positioned in the internal space formed by the magnetic circuit guide 150, and the fixing portion 314 of the elastic member 300 may be positioned outside the magnetic circuit guide 150.

The lower surface of the magnetic circuit guide 150 may include an opening. A part of the yoke 200 may be exposed through the opening in the lower surface of the magnetic circuit guide 150. In addition, the magnetic circuit 100 may be seated on the lower surface of the magnetic circuit guide 150.

For example, the top plate 120 of the magnetic circuit 100 may be seated on the lower surface of the magnetic circuit guide 150. A lower surface of the top plate 120 may include a stepped portion, and the top plate 120 may be seated on the lower surface of the magnetic circuit guide 150 by the stepped portion of the top plate 120.

According to another exemplary embodiment of the present disclosure, the top plate 120 may be attached to the lower surface of the magnetic circuit guide 150. The top plate 120 may be fixed by being attached to the lower surface of the magnetic circuit guide 150.

Figure 16:
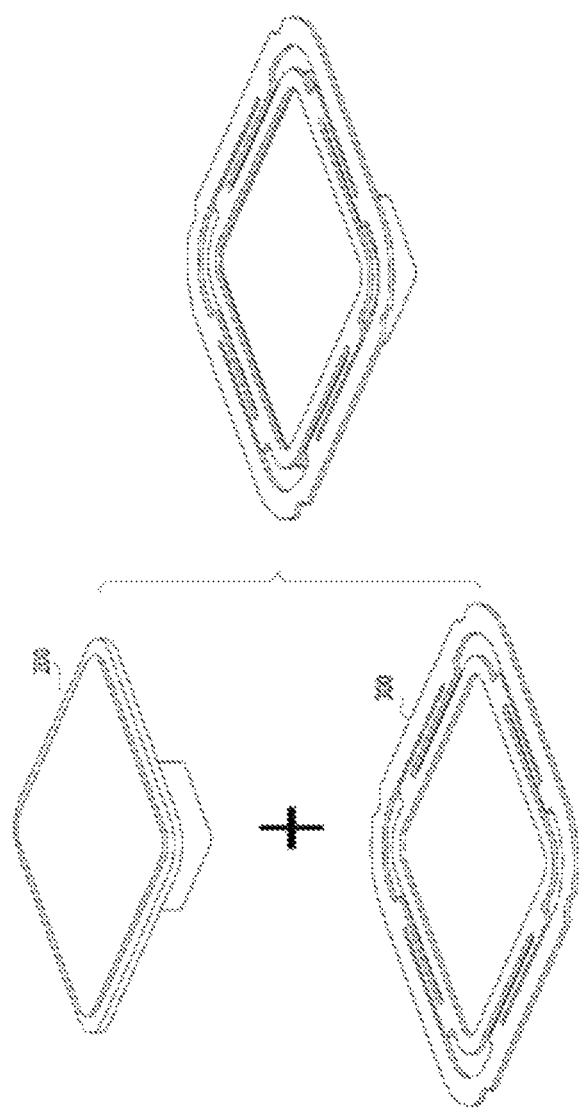
FIG. 16 is a view for explaining a method of coupling the elastic member and a yoke according to another exemplary embodiment of the present disclosure.

FIG. 16 is a view for explaining a method of coupling the elastic member and the yoke according to another exemplary embodiment of the present disclosure.

According to the exemplary embodiment of the present disclosure, the vibration portion 312 of the elastic member 300 may be formed in a shape surrounded by four edges of which the intersection points are curved. In addition, the fixing portion 314 of the elastic member 300 may also be formed in a shape surrounded by four edges of which the intersection points are curved.

In this case, the vibration portion 312 of the elastic member 300 and the fixing portion 314 of the elastic member 300 may include therein openings. In addition, the opening included in the vibration portion 312 of the elastic member 300 may be smaller than the opening included in the fixing portion 314.

In addition, the vibration portion 312 of the elastic member 300 may be positioned in the opening included in the fixing portion 314 of the elastic member 300.

The vibration portion 312 of the elastic member 300 and the fixing portion 314 of the elastic member 300 may be connected to each other through the connecting portion 316. The connecting portion may have various shapes.

The fixing portion 314, the connecting portion 316, and the vibration portion 312 may be separately or integrally formed, but the present disclosure is not limited thereto.

According to the exemplary embodiment of the present disclosure, the upper surface of the yoke 200 may be formed in a shape surrounded by four edges of which the intersection points are curved. In addition, the upper surface of the yoke 200 may include a groove at the edge thereof.

Referring to FIG. 16, the elastic member 300 may be seated in the groove formed at the edge of the upper surface of the yoke 200. For example, the vibration portion 312 of the elastic member 300 may be formed in the groove formed at the edge of the upper surface of the yoke 200.

Figure 17:
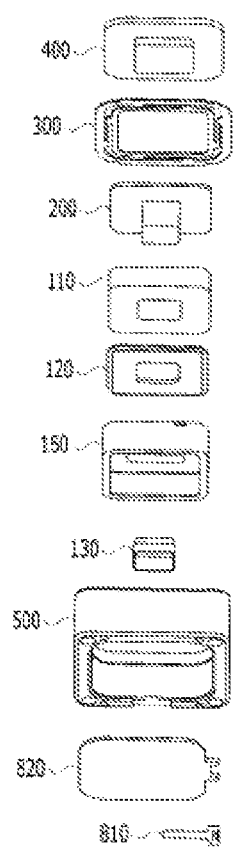
FIG. 17 is a view for explaining the sound generator according to another exemplary embodiment of the present disclosure.

FIG. 17 is a view for explaining the sound generator according to another exemplary embodiment of the present disclosure.

The sound generator 1000 according to the exemplary embodiment of the present disclosure may include the PCB 810. The PCB 810 may be provided on at least a part of the upper surface of the cap 820. The cap 820 may connect and fix the housing 500 and the PCB 810.

The housing 500 includes the openings formed in the upper and lower surfaces thereof, and four sides (e.g., the left side, the right side, the rear side, and the front side) of the housing 500 are closed, such that the housing 500 may have an internal space. The coil 130 may be provided in the internal space in the housing 500. The coil 130 may change a magnetic field in accordance with the alternating current signal applied from the outside. The magnetic circuit 100 may be provided to be spaced apart from the coil 130 at a predetermined interval without being in contact with the coil 130. The magnetic circuit 100 may be provided with the top plate 120 which may concentrate magnetic force of the magnet 110.

The yoke 200 may be provided on the upper surface of the magnetic circuit 100, and the vibration of the magnetic circuit 100 may be transmitted to the yoke 200. In this case, the magnetic circuit 100 may be coupled to the yoke 200 by being attached directly to the yoke 200, or may be coupled to the yoke 200 by the magnetic circuit guide 150.

The upper surface of the yoke 200 may have various shapes. For example, the upper surface of the yoke 200 may have a flat circular plate shape having no stepped portion. In addition, since the upper surface of the yoke 200 includes the at least one stepped portion, it is possible to form the space in which the elastic member 300 may vibrate.

In addition, the upper surface of the yoke 200 may be formed in a shape surrounded by four edges of which the intersection points are curved. In addition, the upper surface of the yoke 200 may include the groove at the edge thereof, and the vibration portion 312 of the elastic member 300 may be seated in the groove formed at the edge of the upper surface of the yoke 200.

The vibration portion of the elastic member 300 may be in contact with a part of the upper surface of the yoke 200, and the fixing portion 314 of the elastic member 300 may be fixed to at least a part of the inner surface of the housing 500.

The vibration plate 400 is provided on the upper surface of the yoke 200, thereby transmitting the vibration of the magnetic circuit 100 to the vehicle body. The vibration transmitted to the vehicle body may vibrate a part of the vehicle body, thereby generating sound.

At least some of the aforementioned constituent elements may be coupled in other manners instead of riveting. For example, the elastic member 300 is attached directly to the yoke 200, and the vibration plate 400 is also attached directly to the yoke 200, such that the sound generator 1000 may have a structure from which the riveting is omitted. In addition, the elastic member 300, the yoke 200, and the magnetic circuit 100 are fixed by the magnetic circuit guide 150, thereby providing a structure from which the riveting is omitted.

Figure 18:
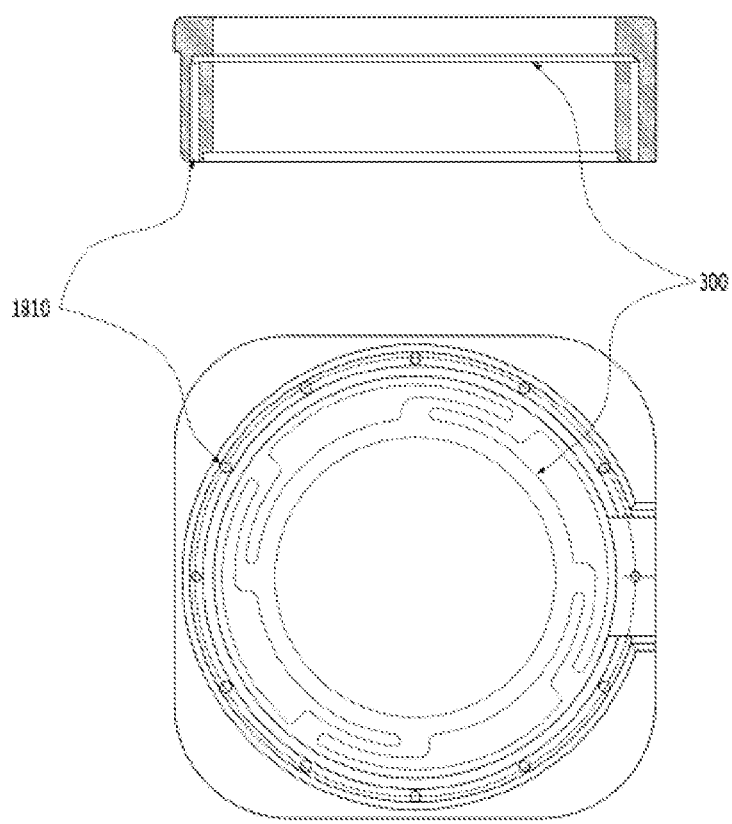
FIG. 18 is a view for explaining holes formed in the sound generator according to the exemplary embodiment of the present disclosure.

FIG. 18 is a view for explaining holes formed in the sound generator according to the exemplary embodiment of the present disclosure.

According to the exemplary embodiment of the present disclosure, holes are formed in the housing 500. In this case, the hole formed in the housing 500 may penetrate the housing 500.

Referring to FIG. 18, the fixing portion 314 of the elastic member 300 may be provided in the housing 500. In this case, the fixing portion 314 of the elastic member 300 may be in contact with one surface formed in the housing 500.

The housing 500 may include at least one hole 1810 formed in one surface which is in contact with the fixing portion 314 of the elastic member 300. The housing 500 may include the multiple holes 1810, but the number of holes 1810 is not limited.

In this case, the multiple holes 1810 may be disposed at predetermined intervals. For example, the multiple holes 1810 may be disposed at predetermined intervals along the fixing portion 314, but the present disclosure is not limited thereto.

The hole 1810, which is formed at a side where the housing 500 and the fixing portion 314 of the elastic member 300 are in contact with each other, may penetrate the housing 500.

Since the hole 1810 penetrates the housing 500, an internal space may be formed in the housing 500. For example, multiple cylindrical spaces may be formed in the housing 500 as the multiple holes 1810 penetrate the housing 500.

The internal space formed in the housing 500 may reduce a defect rate when the sound generator 1000 is formed. A contraction of the housing 500 may be prevented by the internal space formed in the housing 500 when the sound generator 1000 is formed, and as a result, it is possible to significantly reduce defective products.

While the exemplary embodiments of the present disclosure have been described above, those skilled in the art may understand that the present disclosure may be variously modified and changed without departing from the spirit and scope of the present disclosure disclosed in the claims.

MODE FOR INVENTION

Contents related to the best mode for carrying out the invention has been described above.

INDUSTRIAL APPLICABILITY

The present disclosure may be used in various technical fields in which sound is generated by outputting and transmitting vibration.

The invention claimed is:

1. A sound generator which is connected to a vehicle body and generates sound, the sound generator comprising:
   a magnetic circuit generating vibration;
   a yoke contacting an upper surface of the magnetic circuit;
   an elastic member contacting at least a part of an upper surface of the yoke and performing vibration motion;
   a housing including an internal space formed as upper and lower sides of the housing are opened and lateral sides of the housing are closed;
   a coil receiving an alternating current signal provided from the outside, wherein the coil is positioned in the internal space of the housing; and
   a vibration plate contacting at least a portion of the upper surface of the yoke, and transmitting the vibration, which is generated by the magnetic circuit by the vibration of the yoke, to the vehicle body to allow the at least a part of the vehicle body to generate sound,
   wherein the sound generator transmits the vibration generated by the magnetic circuit to the vehicle body and vibrates at least a part of the vehicle body such that sound is generated from the vehicle body.

2. The sound generator of claim 1, further comprising:
   a magnetic circuit guide contacting at least a part of each of the magnetic circuit, the yoke, the elastic member, and the vibration plate.

3. The sound generator of claim 1, wherein the magnetic circuit vibrates in accordance with a change in magnetic field provided by the coil, and the magnetic circuit and the yoke are coupled by a magnetic circuit guide.

4. The sound generator of claim 1, wherein the elastic member includes a fixing portion, a vibration portion, and at least one connecting portion, the fixing portion is fixed by being coupled to an inner surface of the housing, the vibration portion is seated at an outer side of the upper surface of the yoke, and the at least one connecting portion connects the fixing portion and the vibration portion.

5. The sound generator of claim 4, wherein the at least one connecting portion connects the fixing portion and the vibration portion through a hole included in a magnetic circuit guide.

6. The sound generator of claim 1, wherein an interval is formed between a magnetic circuit guide and the housing, and wherein a magnitude of vibration transmitted by the sound generator is changed in accordance with a change in the interval.

7. The sound generator of claim 2, wherein the vibration plate protrudes to the outside from the housing and contacts a vehicle mounting device.

8. The sound generator of claim 1, wherein the magnetic circuit vibrates in accordance with a change in magnetic field provided by the coil.

9. The sound generator of claim 1, wherein at least one hole is formed in the housing.

10. A vehicle which generates virtual engine sound, the vehicle comprising:
    a vehicle information collecting module collecting information about an operation of an engine of the vehicle;
    a sound processing module producing a virtual engine sound signal based on the collected information about the operation of the engine of the vehicle;
    an amplification module amplifying the produced virtual engine sound signal; and
    a sound generator transmitting vibration generated based on the amplified virtual engine sound signal to a vehicle body of the vehicle,
    wherein the sound generator includes:
    a magnetic circuit generating vibration;
    a yoke contacting an upper surface of the magnetic circuit;
    an elastic member contacting at least a part of an upper surface of the yoke and performing vibration motion;
    a housing including an internal space formed as upper and lower sides of the housing are opened and lateral sides of the housing are closed;
    a coil receiving an alternating current signal provided from the outside, wherein the coil is positioned in the internal space of the housing;
    a vibration plate contacting at least a part of the upper surface of the yoke, and transmitting the vibration, which is generated by the magnetic circuit by the vibration of the yoke, to the vehicle body to allow at least a part of the vehicle body to generate sound; and
    a magnetic circuit guide contacting at least a part of each of the magnetic circuit, the yoke, the elastic member, and the vibration plate.

* * * * *